United States Patent [19]

Paterson

[11] 4,451,361

[45] May 29, 1984

[54] APPARATUS FOR REMOVING DISSOLVED IRON FROM WATER

[76] Inventor: Laurene O. Paterson, Box 953, 1219 E. Church St., Adrian, Mich. 49221

[21] Appl. No.: 355,164

[22] Filed: Mar. 5, 1982

Related U.S. Application Data

[63] Continuation-in-part of Ser. No. 103,322, Dec. 14, 1979, abandoned, Ser. No. 145,657, May 2, 1980, abandoned, and Ser. No. 210,923, Nov. 28, 1980, abandoned.

[51] Int. Cl.³ ............................................. C02F 1/64
[52] U.S. Cl. ................................... 210/136; 210/205; 210/275
[58] Field of Search ................. 137/599, 599.1, 892, 137/893; 210/150, 199, 202, 205, 220, 263, 266, 275, 287, 295, 136, 416.1; 261/76, 77, DIG. 75; 417/151, 169, 187

[56] References Cited

U.S. PATENT DOCUMENTS

| | | | |
|---|---|---|---|
| 2,237,882 | 4/1941 | Lawlor et al. | 210/150 |
| 2,543,813 | 3/1951 | Stover | 261/76 |
| 2,953,160 | 9/1960 | Brazier | 137/893 |
| 3,017,347 | 1/1962 | Kratz | 210/763 |
| 3,382,983 | 5/1968 | Stewart | 210/290 |
| 3,649,532 | 3/1972 | McLean | 210/151 |
| 3,853,271 | 12/1974 | Freshour et al. | 261/DIG. 75 |

FOREIGN PATENT DOCUMENTS

| | | |
|---|---|---|
| 29736 | 9/1907 | Austria . |
| 297587 | 3/1916 | Fed. Rep. of Germany . |
| 706362 | 5/1941 | Fed. Rep. of Germany . |
| 2031941 | 1/1972 | Fed. Rep. of Germany . |
| 2413894 | 10/1975 | Fed. Rep. of Germany . |

OTHER PUBLICATIONS

DEMA, Catalog 21.
Hypro Technical Bulletin, No. 166-P.
Penberthy Technical Brochures, "Uscolite Ejector", Circulating Tank Eductors.
Schulte and Koerting Co. Technical Bulletins, "Jet Ejectors", A Selection Guide for Jet Ejectors.

*Primary Examiner*—Ivars C. Cintins

[57] ABSTRACT

An apparatus is provided for removing impurities such as iron compounds from water, which comprises:
(1) an injector-mixer for colloidalizing the iron compounds in water under conditions of high shear and decompression/compression to finely divide existing insoluble iron hydrates, and by dissolution in the water of air in sufficient amount to oxidize and form colloidally dispersed iron hydrates from the dissolved iron present, thereby providing substantially all of the iron in the form of micelles having a surface charge;
(2) a pressurizer for maintaining the water under a pressure within the range from about 10 to 500 psig;
(3) a bed of particulate material having a surface charge capable of attracting, removing, and collecting the dispersed iron hydrates; and
(4) a backwash system for removing the impurities collected throughout the mass of particulate material.

19 Claims, 5 Drawing Figures

APPARATUS FOR REMOVING DISSOLVED IRON FROM WATER

RELATED APPLICATIONS

This application is a continuation-in-part of application Ser. No. 103,322, filed Dec. 14, 1979, now abandoned, application Ser. No. 145,657, filed May 2, 1980, now abandoned, and application Ser. No. 210,923, filed Nov. 28, 1980 now abandoned.

BACKGROUND OF THE INVENTION

Iron may occur in water as an already-precipitated iron floc, in soluble form or in a colloidal state. Two or all three of the above types may coexist. For the purposes of this invention, the soluble as well as the insoluble forms of the iron are converted to colloidal dimensions.

Where iron occurs as an insoluble floc, such water is commonly known as "red water." "Red water" is objectionable from an aesthetic point of view also deposits out to stain. When iron occurs as "red water", partial or even complete oxidation of the iron has already taken place. The insoluble ferric compounds responsible for the rust color can be removed by a filter, but any remaining soluble ferrous compounds will be subsequently oxidized to deposit downstream.

Iron is present in soluble form in a large proportion of waters, and is one of the most troublesome components of domestic and industrial water supplies because it is extremely difficult to remove, particularly from well water. Iron commonly occurs in well water as the soluble ferrous bicarbonate. Well water is normally not exposed to air until it has been drawn from the well, and so is clear as drawn, but upon exposure to the air it slowly forms an adherent deposit of the insoluble hydrated ferric compounds. The compounds are dark-colored and, consequently, if they are deposited on bathroom or kitchen fixtures, clothes, and other surfaces, ugly stains result which are difficult to remove.

It has been known for some time that the soluble ferrous iron present in water can be oxidized to insoluble hydrated ferric compounds upon contact with catalytic manganese oxides. The manganese higher oxides may be provided in a filter as an impregnant on a particulate carrier or as a ground manganese-containing ore. However, the oxidation of the ferrous iron by the manganese oxide results in reduction of the manganese oxide, which then has to be regenerated by treatment with a permanganate salt. This greatly increases the cost of the process and renders it impractical for ordinary household use. Correct dosage is difficult, which means that if there is excess permanganate present that can pass downstream of the filter, it can create as many problems as the iron which the filter is supposed to remove.

The usual way for removing iron from domestic water supplies, such as for household use, is by passing the water through a bed of cation exchange resins. The resin has to be regenerated periodically by treatment with aqueous sodium chloride to restore its ion-removing capacity.

Cation exchange resins used for water softening are not very efficient in the removal of iron. Iron collected in the bed is difficult to desorb during the brine regeneration step. Iron is not readily removed by sodium chloride treatment and requires the inclusion in the brine of an agent such as sodium hydrosulfite or a citrate. Moreover, iron in the water deposits on and plugs the conditioner controls, leading to frequent shutdowns and service calls. If "red water" is passed through the bed, fouling of the resin bed occurs, considerably shortening the onstream cycle.

Soluble ferrous iron can also be oxidized to form filterable hydrated ferric compounds by treatment with agents such as chlorine, hypochlorite, and chlorine dioxide.

In large water supply systems such as municipal or industrial plants, iron is removed in a soda-lime water softening process or in the aeration of water, followed by filtration.

Aeration of the water is carried out by a variety of means described widely in the literature. Aeration equipment has as a design feature maximum surface exposure of the water to air to promote dissolution of the air in the water. For instance, the cascading of water over slats, the sprinkling of water through air, and the introduction of air into water by the use of spargers is widely practiced. All these methods do speed up the dissolving of the air in the water, but the process is relatively slow due to the surface tension barrier of the water. Equipment is large and its efficiency is poor, unless means is provided to raise the pH of the water.

Reading from *Water Supply, Treatment and Distribution* by Walker, page 202:

> Simple aeration may be all that is required to precipitate the ferrous bicarbonate as ferric hydroxide in accordance with the following equations:
>
> 
>
> Fe(HCO$_3$)$_2$ aeration Fe(OH)$_2$+CO$_2$
>
> further aeration:
>
> 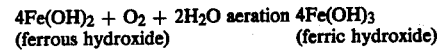
>
> 4Fe(OH)$_2$ + O$_2$ + 2H$_2$O aeration 4Fe(OH)$_3$
> (ferrous hydroxide)　　　　　　　(ferric hydroxide)
>
> In order that the reaction will go to completion and precipitate the ferric hydroxide, it is necessary that the pH be approximately 7 or higher. If possible, the pH should be raised to 7.5 to 8.0, but even so the reaction may take 15 minutes retention before it is complete, and in some cases as much as 1 hour retention has been necessary.

It is postulated by the applicant that the surface tension lowering of the water at higher pH accelerates air dissolution in the water to complete the oxidation of the ferrous iron. Such a process is described by McLean in U.S. Pat. 3,649,532, wherein his aeration device purposely gives delayed and incomplete oxidation until the water enters an alkalizing mineral bed, raising the pH of the water to 7.0 to 7.5.

A concern of the prior art practitioners was the tendency for a portion of the soluble ferrous iron to precipitate out of the water as a colloid. Because of the small dimensions of the colloidal particles, it was thought they could not be trapped in a conventional filter. Expensive precoagulation steps were thought necessary, and are routinely used before filtration to precipitate the iron hydrates.

Reading from the *Journal of the American Water Works Association*, Volume 50, page 689 (1958):

Aeration readily oxidizes ferrous bicarbonate from the soluble form to ferric hydrate, and the hydrate, though present even in the colloidal size, is readily adsorbed and absorbed by conventional flocs produced by the reaction of alum or any of the ferric coagulant.

Reading from the *Nalco Water Handbook,* Nalco Chemical Co., pp. 10-15 (1979):

A fourth aspect of the precipitation process is the zeta potential of the initial heavy metal colloidal precipitate. In many plants where heavy metals are being removed, one of the principal problems in reaching the desired effluent limits is the colloidal state of the precipitated materials—they have not been properly neutralized, coagulated and flocculated.

The process of the present invention uses colloid formation to advantage. It purposely colloidalizes substantially all of the already-precipitated iron hydrate in the water while simultaneously introducing air therein to oxidize the soluble iron. High shear and zones of decompression/compression to which the water is subjected overcome surface tension phenomena and rapidly dissolve air in the water to accelerate its reactivity with the soluble iron to convert it to ferric hydrates, colloidally precipitated. Such colloidal particles inherently carry a surface charge; the very high dispersion factor of the so-formed colloidal system results in enhanced particle surface charge, which makes possible iron removal in a bed of particulate material containing at least localized sites of the opposite charge.

The process of Lawlor et al. U.S. Pat. 2,237,882 typifies an aeration procedure of the prior art to remove iron from water. Lawlor et al. use a crock diffuser, air being supplied by an air compressor. The air passes through the pores of the diffuser into a stream of the iron-containing water in the form of "minute bubbles." Although some iron hydrate colloid may result from such treatment, this method of introducing the air is not conducive to the formation of a colloidal dispersion. The "minute bubbles" themselves carry a negative charge and serve to attract and coagulate any iron hydrate micelles on their surface.

Particulate materials suitable for use in the applicant's filter are numerous. The activity of these materials to precipitate electrostatically-charged micelles depends on the creation on their surface or in their environment of an opposing charge. They are primarily selected on the basis of properties such as rough or porous surface, which increases surface area in the filter bed, and ion exchange capacity to take up such polyvalent ions as calcium and iron to provide localized sites of positive charge in an otherwise negatively-charged media. Particulate materials of choice thus carry both negatively and positively-charged sites to precipitate, respectively, positively and negatively-charged micelles. After the particulate media have exchanged the polyvalent ions, they remain electrostatically active but chemically inert. Applicant has no need to treat the media with an oxidizing chemical such as permanganate, or to use alkalizing materials in the filter to raise the pH to catalyze iron oxidation.

So far as is known, any material capable of carrying a charge in contact with water and capable of being subdivided or compressed into a particulate form and provide a reasonably rough or porous surface, can serve as a filter bed. No continuing chemical interaction is involved so far as is presently known, and no catalytic effect has been detected. The aeration of the water under pressure and high shear is evidently sufficiently quantitative to convert the iron hydrates to colloidal dimensions. Phase boundary interaction between the variously charged micelles and the particulate material through which the water flows leads to a rapid and substantially complete precipitation and removal of the colloidal components.

Because of the small size of the iron-containing micelles, they can penetrate through the upper layers of the filter bed and provide a depth filtration. Iron removal by the prior art, which involved flocculation and sedimentation, resulted in deposition of floc in the upper layers of the filter, causing plugging and necessitating frequent backwashing.

SUMMARY OF THE INVENTION

The apparatus of the present invention is adapted for continuous operation and is capable of removing iron in a single-pass, flow-through system, comprising the steps of:

(1) colloidalization of the iron in water under conditions of high shear and decompression/compression to finely divide existing insoluble iron hydrates, and by dissolving therein air in sufficient amount to oxidize and form colloidally dispersed iron hydrates from the dissolved iron present, thereby providing substantially all the iron in the form of micelles having a surface charge;

(2) maintaining the water under a pressure within the range of about 10 to 500 psig;

(3) then passing the water under a pressure within said range through a mass of particulate material having a surface charge capable of attracting, removing, and collecting the dispersed iron hydrates; and (4) recovering water containing less iron than the starting water, and preferably less than 0.3 mg/liter of iron.

The iron hydrates collected throughout the mass of particulate material are non-adherent and can be easily removed by backwashing.

The term "iron hydrate" as used herein includes any insoluble compound of ferric iron containing water of hydration such as the iron oxides and the hydroxides. Such compounds usually contain ferric iron as cation, but may consist of ferro-ferric complexes. Ferric hydroxide, hydrous ferric oxides, hydrous ferric carbonates and silicates are representative of such compounds.

The bed of particulate material should be held under pressure. It can be placed in a pressure vessel provided with controls for periodic backwash. Such procedure assists in holding the air in solution and completing its reaction with the ferrous iron. Pressure also reduces any tendency for the air to gas-out in the filter media to produce a barrier on the surface of the granules. The bed of particulate material should provide sufficient dwell time to destabilize the iron-containing micelles and precipitate them in the media.

The necessary aeration of the water under the conditions of high shear can be accomplished by a variety of devices. Such device acts as a jet compressor, air being added in controlled amount into a zone of violent agitation. Distinguished from the prior art aerations, the air so added is rapidly solubilized in the water to serve without any additional agent to oxidize the soluble iron and form the colloidal iron hydrate micelles.

Preferred devices that can be used are made up of three basic components: a nozzle, a diffuser, and a housing holding these parts in their relative positions to provide a mixing chamber for the air and the water. Usually, a suction tube terminates in such chamber for the introduction of the air. A device of this type comprises in combination:

(1) a housing having an inlet for water, an inlet for air, and an outlet for aerated water;

(2) a chamber in the housing for adding air to the water, mixing and dissolving it therein;

(3) first, second, and third flow passages in the housing interconnecting the water inlet, the air inlet, and the aerated water outlet, respectively, with the chamber;

(4) means in the first fluid flow passage for projecting a high velocity jet stream of water or air into the chamber across the inlet into the chamber of the second fluid flow passage in a manner to draw air or water from that passage into the chamber and into the high velocity jet stream and obtain violently turbulent mixing of the two components;

(5) means for controlling the volume amount of at least one of the flows of water or air into the chamber to control the amount of air dissolved in the water;

(6) diffuser means receiving the flow of the aerated water from the chamber and delivering it to the outlet of the housing; and (7) water retention means for maintaining the fluids throughout their passage through the housing under a pressure within the range of 10 to about 500 psig.

BRIEF DESCRIPTION OF THE DRAWINGS

Preferred embodiments of the invention are shown in the drawings, in which.

DETAILED DESCRIPTION OF THE PREFERRED EMBODIMENTS

Figure 2:
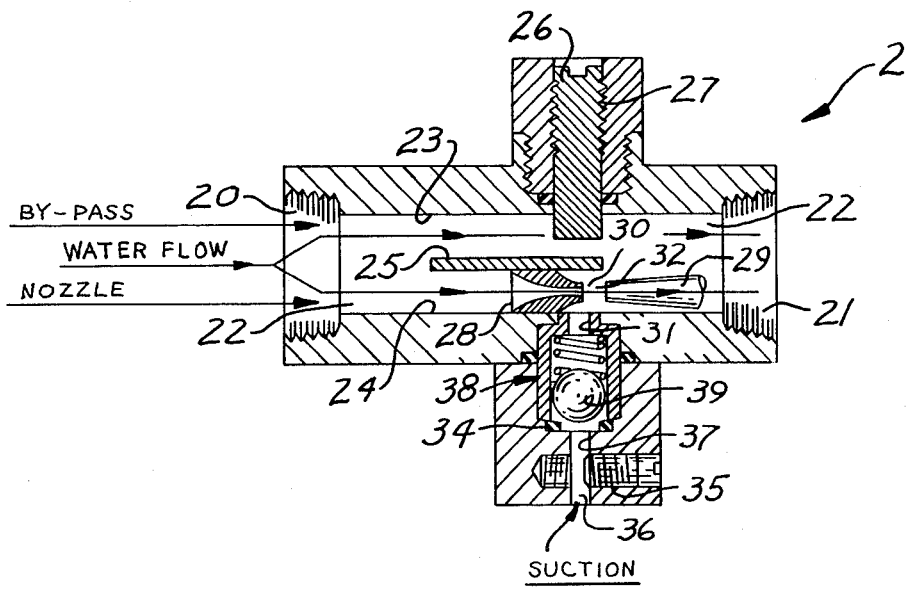
FIG. 2 is a longitudinal section of the injector-mixer of FIG. 1.

A typical device according to one aspect of this invention is shown in FIG. 2, which illustrates the requirements for the process. Such device is called an injector-mixer. It consists of a water inlet 20 and a water outlet 21, interconnected by a flow passage 24 which contains a nozzle 28 terminating in a chamber 30. The chamber 30 has a suction inlet 31 and an outlet 32 which leads into a diffuser 29. The position of the chamber 30 is critical in relation to the nozzle 28, the diffuser 29, and the suction inlet 31 to create a proper suction and provide a zone for air-water mixing.

The suction inlet 31 provides for air intake into the chamber 30. The air thus introduced mixes violently with the water ejected from the nozzle into the chamber. Control of the amount of air added is accomplished by the setting of a screw 35, which is housed adjacent to an inlet 36. An air flow passage 37 interconnecting the inlet 36 with the suction inlet 31 has a section 38 housing a ball check valve and defining an annular passage for air flow past a ball 39. When fluid flow through the nozzle ceases, as by shutdown of a pump, so does aspiration of the air. Fluid pressure in the system closes the ball check valve, the ball 39 seating against the sealing gasket 34.

The device may also contain a bypass to divert from the nozzle a portion of the water being pumped. Such bypass may be enclosed in the same housing as the flow passage 24 (see FIG. 2) or it may be external to the body of the injector-mixer. In FIG. 2, the flow passage is divided into two sub-passages 23 and 24 by the wall 25. The amount of water passing through the bypass is controlled by positioning the screw 26, which can be moved between positions all the way across the passage to the wall 25, or fully withdrawn into the threaded socket 27. If the bypass is external to the housing, an auxiliary valve in this line controls the amount of water diverted from the nozzle.

The bypass is a desirable feature, since the amount of air intake through the suction tube is proportional to the amount of water passing through the nozzle. The valving in the bypass to divert more or less water from the nozzle provides a complementary means of air dosage control. The by-pass also increases the amount of water which can be pumped through a given size injector-mixer without placing excessive back-pressure on the pump. In the suction chamber, the air and water are violently mixed, and the mixture escapes via the diffuser 29 to be turbulently blended into the bypass stream. The conditions of high shear and decompression/compression of the water lead to very rapid dissolution of the air in the water to react with the dissolved iron and form the colloidal system desired. The air is first drawn through the suction tube into the chamber, an area of decompression; then it is compressed again as it moves, mixed with the water, down the diffuser.

Another type of injector-mixer that is particularly adapted for use in larger systems such as municipal supplies, where greater volumes of water are pumped and more air is involved, may take several forms. The device may consist of a succession of nozzles, followed by expansion chambers enclosed in a single housing and terminating in a single diffuser. Controlled amounts of air are introduced into at least one chamber by a suction tube equipped with a check valve and valve for controlling air intake. The additional shear and decompression/compression through the subsequent nozzle or nozzles for the air-water mixing lead to complete dissolution of the air in the water, and quantitative oxidation of the soluble iron to form the colloidal dispersion.

Figure 3:
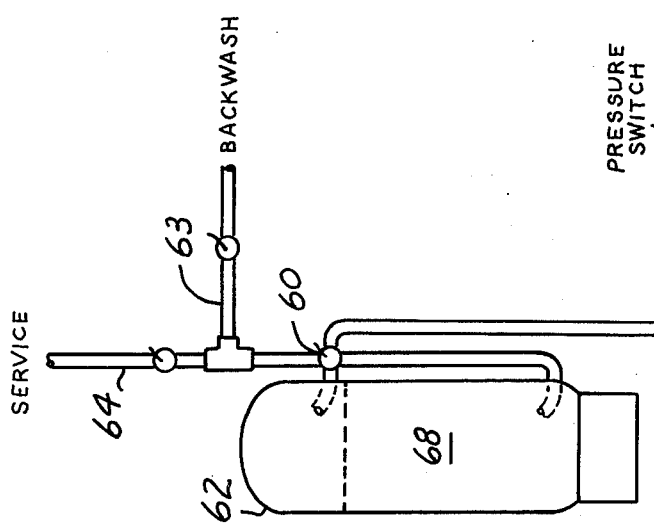
FIG. 3 is a flow sheet showing the apparatus components of a municipal or community water system including the apparatus of the invention.
Figure 3:
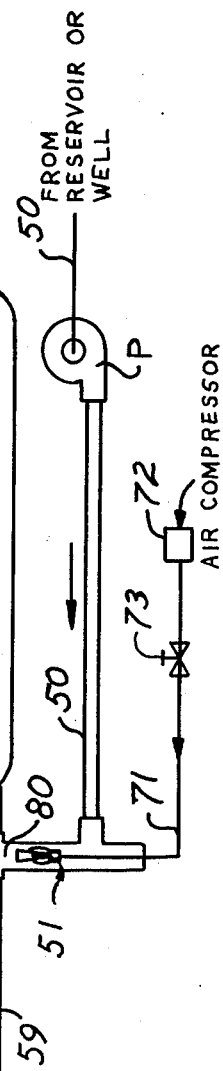

Other municipal systems where the piping is large may find it more advantageous to use air as the motive force. An injector-mixer is immersed in a pressurized stream of pumped water and air from a compressor is injected through the nozzle to suck in water via orifices peripheral to the chamber. Such a device is shown in FIG. 3.

Still another method of injecting controlled amounts of air into the water is by insertion of a snifter valve containing check means into a water system upstream of the mixer, such as on the suction side of a pump. The snifter valve will open to draw in air when the pump is running, but will close on pump shutoff. The amount of air added through the snifter valve must be carefully controlled by screw or other means to provide enough oxygen for iron oxidation but not enough to cause the pump to lose its prime. The air-water mixer inserted downstream of the snifter valve has no need to draw in air, but can take the form of a nozzle or series of nozzles with diffuser.

While the aeration of the water clearly results in at least partial oxidation of the ferrous iron to a ferric state, and most such ferric compounds show a rusty hue in water, the aerated water downstream of the injector-mixer may nevertheless be clear to the naked eye. The iron hydrates contained therein probably exist in the form of an invisible sol. Retention of the iron hydrates in a colloidal state and avoidance of their coagulation are important features of the invention, so that a large surface area of highly charged micelles may be presented to the particulate media during the filtration step.

It has been noted that particulate materials having a rough surface, such as a nodulous or porous surface, and therefore an appreciably larger surface area, tend to attract, collect, and remove the iron hydrate micelles more effectively. Porous, rough-surfaced materials such as pumice and diatomite are especially good examples of suitable materials. The materials can be rough, as naturally occurring after being subdivided to a convenient particle size, or as synthetically compacted or compressed into shapes or aggregates from smaller particles, such as extruded rods.

Exemplary particulate materials are the siliceous rocks, such as silica sand and diatomaceous earths, the aluminum silicates including the milled-classified materials and extruded or compressed materials, e.g., the bentonites, kaolin, feldspar, the zeolites, perlite, pumice, and other forms of lava. Perlite and pumice are especially effective, and are preferred. Also satisfactory are the magnesium silicates, such as talc. Natural aluminas, such as bauxite and the purified bauxites ($Al_2O_3$), and the hydrated aluminas can be used, as well as the dolomites, limestone, and magnesia, and the various mixed forms such as partially calcined dolomite, calcium carbonate, magnesium hydroxycarbonate, and magnesium aluminum oxide ($MgO.Al_2O_3$). The various forms of carbon such as coke, charcoal and activated carbon extrusions or compressed shapes are also suitable. Mixtures of two or more of these materials can be used. As is evident, the range of suitable filtering materials is large. The common requirement for such suitable materials is that they offer a charged surface in contact with the water.

The particle size of the particulate material is such as would prevail in any filter. Finer materials tend to cake and block the flow, while the larger particles do not provide a sufficiently large surface area so that beds of impractical size have to be employed.

Figure 5:
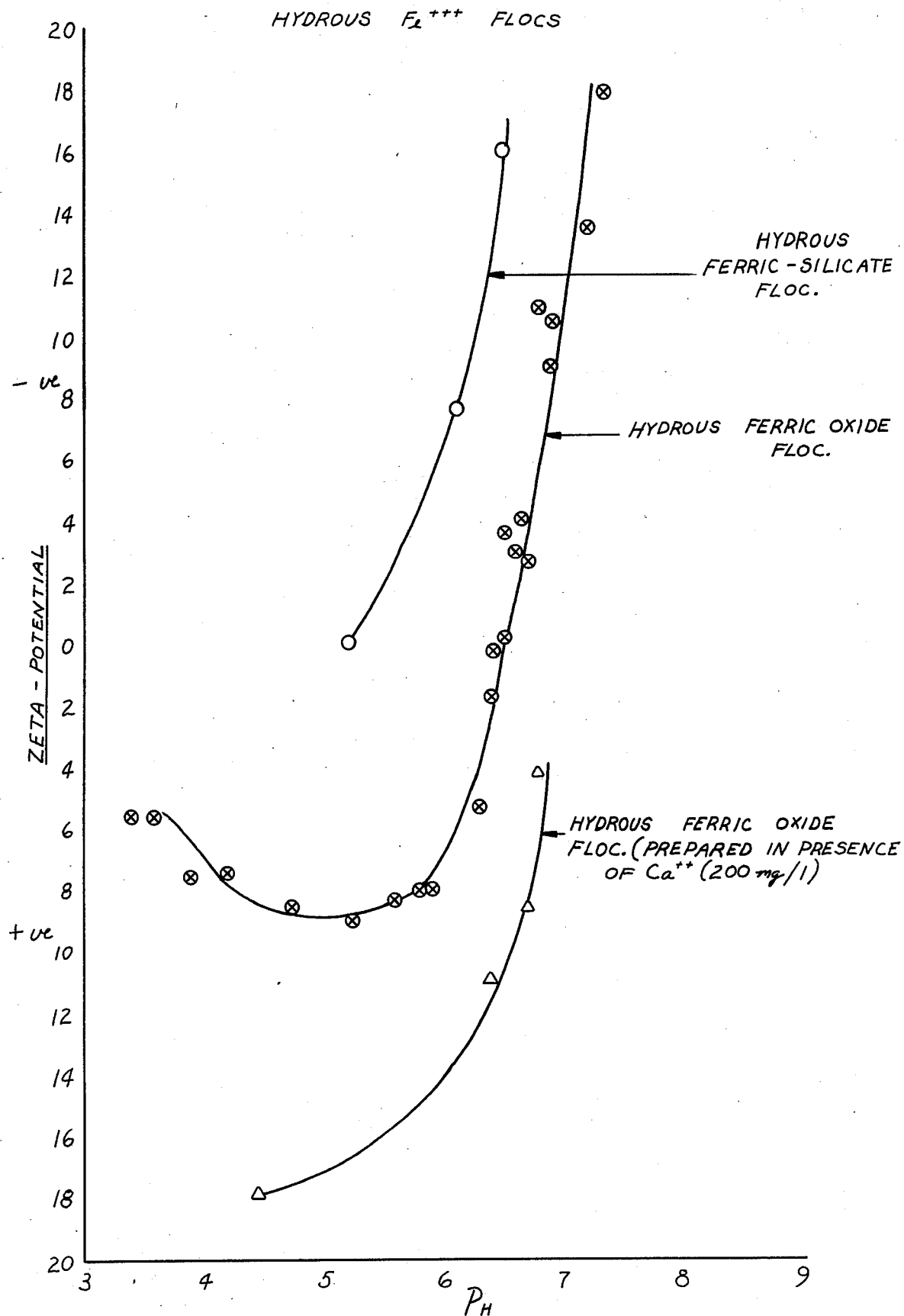
FIG. 5 is a graph showing zeta potential, as determined on the Riddick Zetameter, against pH for hydrous ferric oxide floc, hydrous ferric silicate floc, and hydrous ferric oxide floc prepared in the presence of calcium ion.

The colloidal system which results from the aeration of the water passing through the injector-mixer is complex, and in fact may vary from water to water. It is known that pH plays an important role in determining the type of charge on the micelles. As shown in FIG. 5, hydrated ferric oxides in distilled water carry a positive charge below pH 6.5, above which point they carry an increasingly negative charge as the pH rises. The curves also show the effect of ionic calcium on the zeta potential of the hydrous ferric oxide dispersion, making it more positive in nature.

Potable waters usually have a pH within the range of 5.5 to 9.5. The process of the invention successfully removes iron within this range, most proficiently within the range of about 6.5 to 7.5. When the water contains free acid, as is common in some parts of the country, dolomite, limestone, and their partially calcined counterparts or magnesia aggregates may be used in the filter. They serve to take up such acid and raise the pH to 5.5 or more, acting also to precipitate and collect the iron-containing micelles in the filter.

Most well waters contain silica, and in this instance a colloidal hydrous ferric silicate is probably formed. By referring to FIG. 5, it is seen that the floc consisting of hydrous ferric silicate shows the expected negative charge, even at a pH as low as 5.5. Moreover, hydrous ferric oxides and hydroxides readily adsorb multivalent cations of the type of $Ca++$ and $Fe+++$ to increase their positive potential and act in the filter bed to remove negatively-charged micelles.

Figure 1:
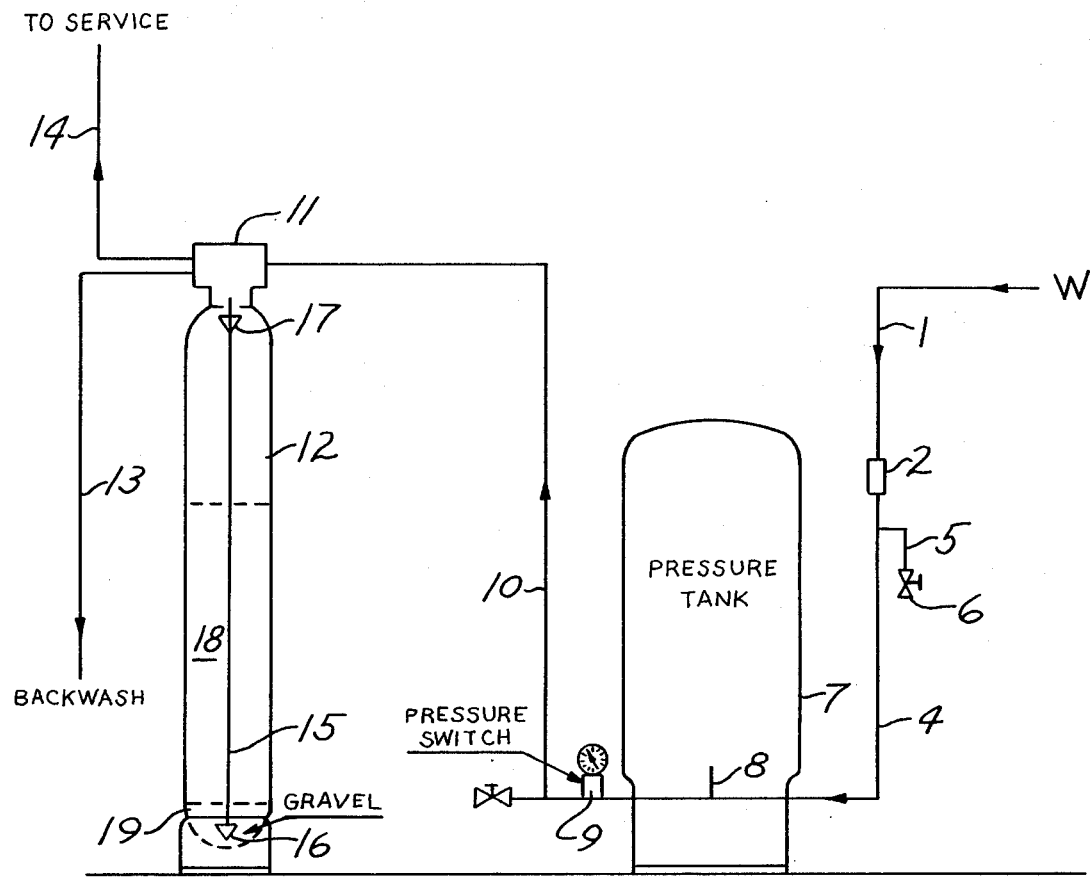
FIG. 1 is a flow sheet showing the apparatus components of a domestic or household water system including the apparatus of the invention.

FIG. 1 is a flow sheet showing the components of a domestic water system, including an apparatus embodying the invention. Such domestic water system receives water pumped from a well W via line 1, which is led into the injector-mixer 2 shown in detail in FIG. 2. The aerated water passes into line 4, which directly downstream of the mixer is tapped via line 5 and valve 6 for sampling the aerated water. Such sampling permits monitoring of the amount of oxygen in the water at this point. Most pressurized water systems include a water holding tank such as tank 7 equipped with a pressure switch. Either an air-blanketed tank or a diaphragm-containing tank may be used. However, even when water is pumped directly to the bed of particulate material held in tank 12, iron residuals are often reduced to acceptable levels in the effluent water, since the oxidation of the soluble iron compounds in the water proceeds rapidly in the injector-mixer. When used, water enters the pressure holding tank 7 via the line 8 at the bottom until the tank is under a predetermined maximum gauge pressure, say 40 psig, and then the pressure switch kicks off, shutting off the pump. Water is drawn from the tank whenever a faucet is opened, until the tank is drawn down to a predetermined minimum pressure, say 20 psig, whereupon the pressure switch kicks on, starting the pump to repressurize the tank to the 40 psig.

Downstream of the switch, the water, containing iron hydrate micelles, passes via line 10 to the control valve 11, which directs the flow of water into the tank 12 and, alternatively, to the backwash line 13 or to the service line 14. The tank 12 is provided with a dip tube 15 extending from top to bottom of the tank, with screens 17 and 16 at the top and bottom ends. The top of the dip tube 15 is directly connected to the valve 11, which directs flow in either direction in the line between either the service line 14 or the backwash line 13.

The tank 12 contains a bed 18 of particulate material such as pumice supported on a gravel layer 19, deep enough to cover the screen 16.

The flow entering the tank 12 from the line 10 is directed by the valve 11 to the top of the bed 18, and passes down through the bed to and through the gravel layer 19 and then enters the dip tube 15 via screen 16, whence it re-enters the valve 11 and is directed into line 14 to service.

When it is necessary to remove the collected iron hydrate sludge from the bed 18, the backwashing mode is adopted. The valve 11 is turned so that the influent flow is directed into the dip tube 15, out through the screen 16, and upwardly through the bed. This removes the collected iron hydrates, which pass through the screen 17 to be dumped by the backwash line 13.

Figure 4:
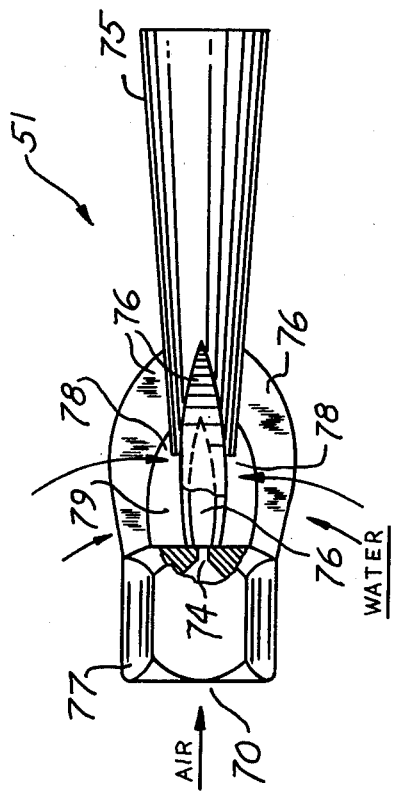
FIG. 4 is a longitudinal section of the injectormixer of FIG. 3.

FIG. 3 is a flow sheet showing the components of a municipal water system including an apparatus embodying the invention. The municipal water system shown in FIG. 3 receives water pumped by pump P from a reservoir or well (not shown) via line 50, around and through the injector-mixer 51 (shown in detail in FIG. 4) into the pressure holding tank 52. The aerated water downstream of the mixer 51 passes into line 54, which can be tapped by a line and valve (not shown, but as in FIG. 1) for sampling the aerated water. Such sampling permits monitoring of the amount of oxygen in the water. The water enters the pressure holding tank 52 via the line 54 at one end until the tank is under a predetermined maximum gauge pressure, say 75 psig, whereupon the pressure switch 59 kicks off to shut down the pump P. Water escapes from the tank 52 whenever a withdrawal is made, until the gauge registers a pressure of say 50 psig, whereupon the pressure switch 59 kicks on to restart the pump. The water enters the valve 60 and is directed into the line 64 to service.

When the bed 68 needs to have the collected iron hydrates removed from the particulate material 68, the backwashing mode is adopted, as in FIG. 1. The valve 60 is set so that the influent flow is directed in a reverse direction through the bed. This unloads the collected sludge, which is drawn through an upper screen (not shown) and thence dumped via the backwash line 63.

The injector-mixer in this instance uses air as the motive force to mix the air in the water. The injector-mixer 51 is shown in detail in FIG. 4. It has an air inlet 70 fed by air under pressure from line 71, the air being supplied by the compressor 72. The line 71 is provided with a valve 73 which can be moved into selected positions according to the amount of air required for the aeration. The air inlet 70 communicates with an orifice 74, sized according to air flow so as to create a vacuum into which water is drawn through the openings 78 defined by the supports 76. In the chamber 79 the air violently mixes with the water. Continuous with the chamber a diffuser 75 is carried on the four supports 76 anchored to the orifice housing 77 of the mixer 51. The air-water mixture enters the diffuser 75, and after leaving the diffuser is turbulently blended with the main stream of the water in passage 80.

In operation, water flow from line 50 is divided into main flow via passage 80 and flow drawn into the mixing chamber 79 via the openings defined by the supports 76. The air jet from the orifice 74 aspirates an amount of water controlled by the air velocity through the orifice, which in turn is controlled by the valve 73 and the air compressor 72, and also by the size of the orifice 74. A number of such injector-mixers may be inserted in the pipe 80 if the requirement exists and the pipe is sufficiently large.

Theoretically, 1 mg/liter of dissolved oxygen will oxidize 7 mg/liter of ferrous iron to the ferric state. This minimum amount would be required to convert the ferrous iron to the hydrated ferric oxides. However, more than this can be used to facilitate the conversion process. Example 14 shows that three times the theoretical amount gives virtually quantitative iron removal. In a case of high iron content, such as 25 mg/liter soluble iron, the oxygen content need not exceed 10 mg/liter. It is to be understood that oxygen gas may be substituted for air in all examples cited.

The following Examples, in the opinion of the inventor, represent preferred embodiments of the invention.

EXAMPLES 1 to 12

In these Examples, the apparatus used for the test runs comprised a submerged pump, a Well-x-trol diaphragm pressure tank, and a filter bed. The Well-x-trol tank was provided with a pressure switch with a setting of 20 psig to initiate pump start, and a 40 psig setting for pump stop. Between these pressure limits, the pump had an average pumping rate of 19 gpm.

The pressure tank had a total capacity of 10 gallons per pumping cycle.

The particulate material used, as shown in Table I, was confined in a vertical tank 9 inches in diameter and 48 inches high. The tank was loaded to a depth of 26 inches with granular particulate material of the type indicated in the Table, such as, for instance in Example 1, pumice granules, and the particulate material held in place by a coarse gravel underlay 6 inches deep. The bed of particulate material acted to collect and remove the iron hydrate micelles present in the aerated water.

The tank was provided with a manual control valve permitting the water to pass through the bed to service or by backwash to drain.

The water as pumped from the well was analyzed, and found to contain 4.5 mg/liter of soluble iron. To prepare the system for service, the particulate bed was backwashed to remove excessive fines and orient the bed by particle size. With the filter control valve in the service position, water was then passed continuously through the bed, at the rate of 4 gpm/sq. ft., and samples were taken for iron analysis.

First, the test runs were carried out omitting the injector-mixer from the system and leading the well water directly to the pressure tank. Little or no reduction in the iron content of the water occurred in this series, as may be seen in Table I.

Next, the test runs were carried out with the injector-mixer. For aeration of the water, the injector-mixer was interposed between the pump and the pressure tank. The air intake through the suction tube was regulated to provide a dissolved oxygen content in the water of 1.2 mg/l. The treated water was then passed through the bed of particulate material, and again water samples were taken and analyzed for iron.

The effectiveness of the injector-mixer in removing the iron is apparent from Table 1. The most effective particulate material listed was pumice, which reduced the iron content to less than 0.05 mg/l. Extruded bentonite and kaolin were also very effective. Least effective were anthracite and silica sand No. 1, which were not rough but had a smooth, glasslike surface. Silica sand No. 2 showed a rough nodulous surface under microscopic examination, confirming the effect of the rough surface on the removal efficiency of the material.

TABLE I

| | | | | | Effluent water | |
| --- | --- | --- | --- | --- | --- | --- |
| | | | | | Aerated 1.2 mg/l $O_2$ | Non-aerated |
| Example No. | Particulate Material | Particle Size | Surface | Excoriates | Fe-mg/l | Fe-mg/l |
| 1 | Pumice[1] | 0.6 mm | rough | yes | 0.05 | 4.2 |

TABLE I-continued

| Example No. | Particulate Material | Particle Size | Surface | Excoriates | Effluent water Aerated 1.2 mg/l O$_2$ Fe-mg/l | Non-aerated Fe-mg/l |
| --- | --- | --- | --- | --- | --- | --- |
| 2 | Coke[1] | 0.82 mm | porous rough | Slightly | 1.5 | 4.3 |
| 3 | Carbon[2] | 1/16 inch | porous rough | yes | 0.8 | 4.3 |
| 4 | Anthracite[1] | 0.8 mm | smooth | no | 3.8 | 4.4 |
| 5 | Sand No. 1[1] | 0.7 mm | smooth | no | 3.2 | 4.3 |
| 6 | Sand No. 2[1] | 1.0 mm | rough | no | 1.75 | 4.4 |
| 7 | Talc[1] | 0.84 mm | rough | yes | 0.5 | 4.3 |
| 8 | Diatomaceous earth[2] | 1/16 inch | rough[4] | yes | 0.5 | 4.3 |
| 9 | Bentonite[2] | 1/16 inch | rough[4] | yes | 0.3 | 4.4 |
| 10 | Kaolin[2] | 1/16 inch | rough[4] | yes | 0.3 | 4.4 |
| 11 | Zeolite[2] ion exchange aluminum silicate | 1/16 inch | rough[4] | Slight | 0.6 | 4.3 |
| 12 | Dolomite, partially calcined | 0.65 mm | rough | yes | 0.07 | 4.3 |

[1]media were screened to provide particle size as shown
[2]media were milled, wet extruded and dried
[3]water had a pH of 6.9 and contained 4.5 mg/liter of dissolved iron. It was passed through the filter at a rate of 4 gpm/ft$^2$.
[4]roughened by excoriation in use

EXAMPLES 13 to 15

Using the same apparatus as Examples 1 to 12 with a pumice bed screened to provide pumice particles 0.6 mm in diameter, a series of runs were carried out at different flow rates, at different amounts of oxygen added through the injector-mixer, and at different pH's. In Example 13, the flow rate was varied. In Example 14, the amount of oxygen was varied, and in Example 15, the pH of the water was varied. The well water contained 4.5 mg/l of dissolved iron, and would require a theoretical dosage of 0.675 mg/l of dissolved oxygen to completely oxidize the contained ferrous iron.

The results obtained are shown in Table II.

mg/liter of soluble iron, the maximum amount usually found in a water supply. The results obtained are shown in Table III.

TABLE III

| | Grain Size (mm) | Surface | Excoriates | Aerated 5.2 mg/l O$_2$ Fe-mg/l |
| --- | --- | --- | --- | --- |
| pumice | 0.6 | rough porous | yes | 0.17 |

EXAMPLE 17

In this Example, the community water system shown

TABLE II

| Example No. | Particulate Material | Flow rate (gpm/ft$^2$) | Aerated O$_2$ (mg/l) | pH of well water | Fe-in effluent (mg/l) |
| --- | --- | --- | --- | --- | --- |
| 13 | Pumice- ground and screened 0.06 mm | 2.8 | 1.4 | 6.9 | 0.02 |
| | | 3.7 | 1.4 | 6.9 | 0.05 |
| | | 4.5 | 1.4 | 6.9 | 0.2 |
| | | 9.3 | 1.4 | 6.9 | 0.6 |
| | | 10.0 | 1.4 | 6.9 | 0.8 |
| 14 | Pumice as above | 4.5 | 0.7 | 6.9 | 0.2 |
| | | 4.5 | 1.0 | 6.9 | 0.2 |
| | | 4.5 | 1.2 | 6.9 | 0.1 |
| | | 4.5 | 1.6 | 6.9 | 0.04 |
| | | 4.5 | 2.0 | 6.9 | 0.02 |
| 15 | Pumice as above | 4.5 | 1.2 | 6.25 | 1.2 |
| | | 4.5 | 1.2 | 6.4 | 0.8 |
| | | 4.5 | 1.2 | 6.6 | 0.6 |
| | | 4.5 | 1.2 | 6.8 | 0.2 |
| | | 4.5 | 1.2 | 7.1 | 0.05 |

The results for Example 13 show that a slower flow rate through the bed improves iron removal efficiency. A longer retention time in the bed promotes collection and removal of the iron hydrates and also prevents a breakthrough of iron-containing floc through the bed.

The results for Example 14 show that more than the theoretical amount of oxygen, about 0.7 mg/l, is beneficial in improving iron removal efficiency Best results are obtained at three times the theoretical amount.

The results for Example 15 show that pH should exceed 6.4 for optimum iron removal efficiency. Best results are obtained at a pH of 6.8 and above.

EXAMPLE 16

Using the apparatus of Examples 1 to 12, a run was carried out using pumice with water containing 25 in FIG. 3 was used, with a pump, a 4300-gallon pressure tank, and a 36"×6' bed of particulate material provided with the necessary 6" piping and controls for backwashing. A pressure range of 50 to 75 psig was maintained in the system. The particulate material used in the bed consisted of expanded perlite having an average particle size of 0.8 mm. Water containing 3.2 mg/l of iron was pumped to the pressure tank at a rate of 80 gpm and was aerated in 6" piping by using two small injector-mixers inserted as shown. The compressor was set to deliver air through the injectors to provide an O$_2$ content in the water of 1.2 mg/l. The system was well backwashed and allowed to come to equilibrium by water withdrawal over a two-day period. At the end of this time, the pH was found to be 7.0 and iron reduced to 0.12 mg/l. Water withdrawal rates continued at about 3000 gallons per day; backwashing to remove the collected iron-containing sludge was carried out once weekly.

EXAMPLE 18

Using the same apparatus as in Examples 1 to 12, a suction pump was substituted for the submersible pump. The suction pump was fitted with a snifter valve provided with a spring-loaded check valve at the suction connection of the pump. A screw protruding into the air stream controlled flow rate of air into the water. An injector-mixer was inserted downstream of the pump, between the pump and the pressure tank. The suction inlet of the injector-mixer for air intake was eliminated. The analysis of the effluent water showed an iron content of 0.5 mg/l.

What is claimed is:

1. Apparatus for removing iron from water which comprises in combination, and in sequential fluid flow connection:
   (1) an injector mixer subjecting water having iron therein to high turbulence and high shear to a degree sufficient to colloidalize existing insoluble iron hydrates and form colloidally dispersed iron hydrates from substantially all the dissolved iron present, thereby providing the iron in the form of micelles having a surface charge; said injector-mixer having in sequential fluid communication a nozzle through which a first fluid selected from the group consisting of water, air and oxygen may be passed; a mixing chamber and a diffuser means for raising the pressure of said fluid to that of a downstream system; means for introducing into said chamber a second fluid selected from the group consisting of water, air and oxygen, one of said first and second fluids being water, the other of said first and second fluids being a gas selected from the group consisting of air and oxygen; and auxiliary valving to provide sufficient gas to form colloidally dispersed hydrated iron oxides having a surface charge;
   (2) means for maintaining the so-treated water under a pressure within the range from about 10 to 500 psig;
   (3) a tank comprising a bed of particulate material having electrostatically charged surface area capable of adsorbing and removing said iron hydrates from the water;
   (4) means for passing the water from the injector mixer into the tank and through the bed; and
   (5) means for delivering water having low iron residuals from the bed.

2. Apparatus according to claim 1 in which the injector-mixer comprises a mixing chamber defining a zone of decompression and having at least one fluid inlet wherein fluid is admitted to said chamber in a controlled manner.

3. Apparatus according to claim 1 wherein the second fluid is air and said means for introducing the second fluid into said mixing chamber comprises a suction inlet having a valve therein.

4. Apparatus according to claim 1 wherein the first fluid is selected from the group consisting of air and oxygen, and the second fluid is water, and said means for introducing said water into the mixing chamber comprises a plurality of passageways through which the water is drawn.

5. Apparatus according to claim 1 wherein the injector-mixer includes a by-pass which diverts a selected portion of the water around the nozzle, and a valve controlling the amount of water so by-passed, and thereby the amount of water passed through the nozzle.

6. Apparatus according to claim 1 wherein the injector-mixer includes a valve controlling the amount of air drawn in through the suction inlet.

7. Apparatus according to claim 1 which also includes a backwashing means to remove iron hydrates collected on the bed of particulate material.

8. Apparatus according to claim 1 in which the means for maintaining the water under a pressure within the range from about 10 to 500 psig includes a pressure tank downstream of the injector-mixer.

9. Apparatus according to claim 8 in which the pressure tank is an air-blanketed tank.

10. Apparatus according to claim 8 in which the pressure tank is a diaphragm-fitted tank.

11. Apparatus according to claim 1 in which the injector-mixer comprises a plurality of housed nozzles having expansion chambers to develop high shear and successive decompression/compression to promote complete dissolution of the air in the water and colloidalization of iron hydrates.

12. Apparatus according to claim 1 in which the bed of particulate material comprises particles of siliceous aggregate.

13. Apparatus according to claim 1 in which the bed of particulate material comprises particles of a zeolite.

14. Apparatus according to claim 1 in which the bed of particulate material comprises particles of aluminum silicate.

15. Apparatus according to claim 1 in which the bed of particulate material comprises particles of pumice or perlite.

16. Apparatus according to claim 1 in which the bed of particulate material comprises particles of alumina.

17. Apparatus according to claim 1 in which the bed of particulate material comprises particles selected from the group consisting of olomite, limestone, magnesia, partially calcined dolomite, and magnesium aluminum oxide.

18. Apparatus according to claim 1 in which the bed of particulate material comprises particles of carbonaceous material.

19. Apparatus for removing iron from water which comprises in combination and in sequential fluid flow connection:
   (1) means for subjecting water having iron therein to high turbulence and high shear to a degree sufficient to colloidalize existing insoluble iron hydrates and form colloidally dispersed iron hydrates from substantially all the dissolved iron present, thereby providing the iron in the form of micelles having a surface charge; said means comprising a suction pump and, mounted on the suction side of the pump, an air-intake tube having a check valve and means for controlling the amount of air introduced via the air intake tube into the water; to provide sufficient gas to form colloidally dispersed hydrated iron oxides having a surface charge;
   (2) means for maintaining the so-treated water under a pressure within the range from about 10 to 500 psig;
   (3) a tank comprising a bed of particulate material having electrostatically charged surface area capable of adsorbing and removing said iron hydrates from the water;
   (4) means for passing the water from means (1) into the tank and through the bed; and
   (5) means for delivering water having low iron residuals from the bed.

* * * * *